United States Patent [19]

Ury

[11] 4,058,349
[45] Nov. 15, 1977

[54] PRESSURE HOLDING VALVE

[75] Inventor: John M. Ury, Milwaukee, Wis.

[73] Assignee: Wagner Electric Corporation, Parsippany, N.J.

[21] Appl. No.: 727,880

[22] Filed: Sept. 29, 1976

[51] Int. Cl.² .................................................. B60T 15/30
[52] U.S. Cl. ............................................ 303/69; 137/107; 303/6 M; 303/77
[58] Field of Search .................... 303/6 M, 68, 69, 71, 303/72, 75, 77; 137/102, 107, 853

[56] References Cited

U.S. PATENT DOCUMENTS

| 2,706,487 | 4/1955 | Wilson | 303/69 |
| 2,816,563 | 12/1957 | Pappas | 137/102 |
| 3,285,672 | 11/1966 | Avrea | 303/71 |
| 3,419,030 | 12/1968 | Gratzmuller | 137/102 |
| 3,498,056 | 3/1970 | Avery | 137/107 |
| 3,799,193 | 3/1974 | Greenwood et al. | 137/853 |

FOREIGN PATENT DOCUMENTS 2,433,327   1/1975   Germany ........................... 303/6 M Primary Examiner—George E. A. Halvosa
Assistant Examiner—Edward R. Kazenske
Attorney, Agent, or Firm—Eyre, Mann, Lucas & Just

[57] ABSTRACT

A pneumatic vehicle spring parking brake pressure holding valve abruptly seals an atmospheric outlet and enables the valving of brake release air pressure to the spring parking brakes when the vehicle reservoir attains a first pressure. Parking brake release is thus enabled. In the case of loss of air pressure from the system, the pressure holding valve retains the brakes fully released until the vehicle reservoir air pressure drops to a second pressure which is lower than the first. The pressure holding valve thereupon abruptly opens its atmospheric outlet thereby rapidly exhausting the air pressure in the spring parking brakes and setting them.

6 Claims, 5 Drawing Figures

TYPICAL PERFORMANCE CHARACTERISTICS FOR PRESSURE HOLDING VALVE

FIG. 4
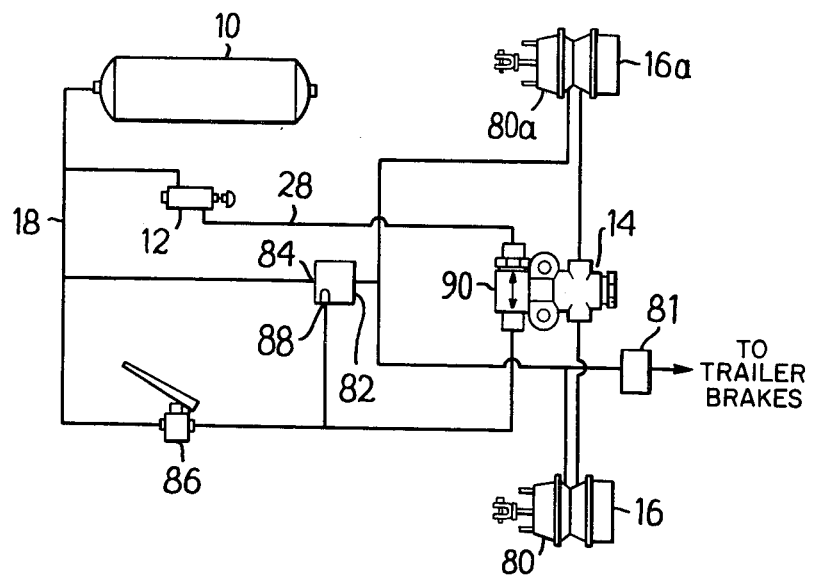
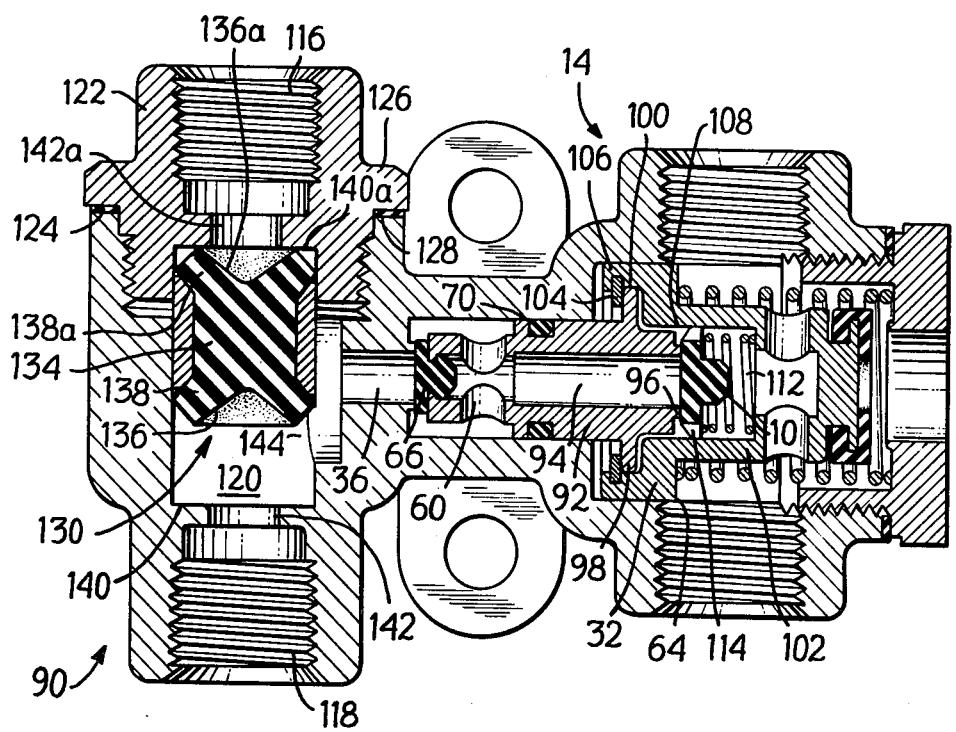
FIG. 5

PRESSURE HOLDING VALVE

BACKGROUND

Vehicles with pneumatic brakes normally have spring-operated parking brakes which cannot be released until a certain minimum air pressure is available in the vehicle's air-pressure reservoir. The spring-operated parking brakes can be set by releasing air pressure from them even when adequate reservoir air pressure exists.

Pressure holding valves are known in the art which hold maximum reservoir air pressure in the spring-operated parking brakes even after the air pressure has been decreased to some intermediate value. These pressure holding valves begin releasing air or pressure at some low value of air. pressure. The point at which prior art pressure holding valves begin releasing air is unpredictable.

Wheel slip control systems, for example, of the type described in U.S. Pat. No. 3,951,467 and assigned to the assignee of the present invention add an additional complication to the performance of the pressure holding valve. The wheel slip control system periodically releases brake pressure when certain measured conditions indicate that a skid is occurring. If not prevented from doing so, the driver could intentionally or accidentally, defeat the operation of the wheel slip control system by operating the parking brake valve while also braking with the normal control. This could lock the vehicle wheels and cause a potentially dangerous skid.

SUMMARY OF THE INVENTION

The present invention teaches an air brake pressure holding valve for controlling the application and exhaust of release air pressure to the spring-actuated parking brakes of a vehicle. A force balance between a spring and the air pressure derived force of the system air pressure acting on the area of an inlet valve must be attained before release air pressure is transmitted to the parking brakes. Brake reapplication due to reduced air pressure is delayed until the force balance between the spring and the air pressure derived force of the system air pressure acting on the area of a piston is overcome. The effective piston area exceeds the effective area of the inlet valve. Thus the brake reapplication takes place at a lower air pressure than that at which brake release was enabled. A check valve retains full release air pressure in the parking brakes even during intermediate partial system pressure reduction as long as the brake reapplication threshold pressure is not reached.

A two-way shuttle valve in one embodiment of the invention prevents accidental or intentional circumvention of the action of a wheel slip control system by operating the parking brake control during a skid. The two-way shuttle valve selects whichever of, a) parking brake control or, b) service brake control lines has the higher air pressure for connection to its output. Thus, if the parking brake control is operated during a skid to vent the parking brake control line, the two-way shuttle valve transfers the operator-commanded value of the service brake control air pressure to the pressure holding valve. This prevents locking of the vehicle wheels by the parking brakes while the service brakes are being applied. This allows the operator to bring the vehicle to a controlled stop using the service brakes. Once the service brake control is released, however, the parking brake will be applied due to the lack of air pressure on either input of the two-way shuttle valve.

BRIEF DESCRIPTION OF THE DRAWINGS

FIG. 4 shows a schematic diagram of a parking brake and service brake system including a wheel slip control valve and an embodiment of the pressure holding valve which includes a two-way shuttle valve.

FIG. 5 shows a longitudinal cross sectional diagram of a second embodiment of the pressure holding valve including the two-way shuttle of FIG. 3.

DETAILED DESCRIPTION OF THE PREFERRED EMBODIMENT

Figure 1:
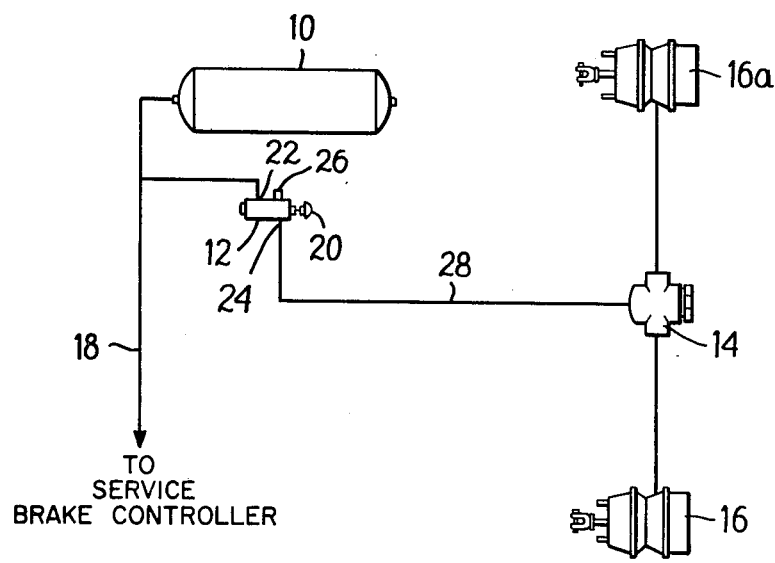
FIG. 1 shows a schematic diagram of the parking brake system for one embodiment of the invention.

Referring to FIG. 1, there is shown a parking brake system made up of an air pressure reservoir 10, a parking brake control 12, a pressure holding valve 14 and one or more air-released spring actuated parking brakes, here represented by two brakes 16 and 16a. An air pressure line 18 from the air pressure reservoir 10 is connected to the vehicle service brakes, omitted here for purposes of simplifying the description.

The parking brake control 12 is controlled by a control knob 20. In its off position, the control knob 20 establishes internal valve connections within the parking brake control 12 to connect its inlet 22 air pressure from the air pressure reservoir 10 to its outlet 24 for connection to the pressure holding valve 14.

At very low air pressure in the air pressure reservoir 10, the pressure holding valve 14 isolates the spring-actuated parking brakes 16, 16a from the air pressure. This ensures that the spring-actuated parking brakes, 16, 16a remains fully engaged at air pressures so low that the vehicle air operated service brakes may be ineffective to control the vehicle. At an accurately predetermined value of air pressure, the pressure holding valve abruptly connects the full value of air pressure then available to the spring-actuated parking brakes 16, 16a. A check valve within the pressure holding valve 14 maintains the peak air pressure to the spring-actuated brakes 16, 16a even with subsequent moderate reductions in reservoir air pressure.

The spring-actuated parking brakes 16, 16a are engaged either by operation of the parking brake control 12 or by the air pressure declining below an accurately determined brake application threshold. When the control knob 12 is placed in the off position, the parking brake control 12 closes its inlet 22 from the air pressure reservoir 10 and connects its outlet 24 to a vent 26. Air pressure in the pressure line 28 to the pressure holding valve 14 is rapidly vented to the atmosphere. Initially, the check valve in the pressure holding valve 14 maintains the full value of the peak air pressure to the spring actuated parking brakes 16, 16a. At an accurately predetermined low value of air pressure in the pressure line 28, the pressure holding valve 14 abruptly vents the air pressure in the air previously maintained to the spring-actuated parking brakes 16, 16a. This sets the spring-actuated parking brakes 16, 16a. A similar brake-setting action occurs if the air pressure reservoir 10 falls below the predetermined low value of air pressure.

Figure 2:
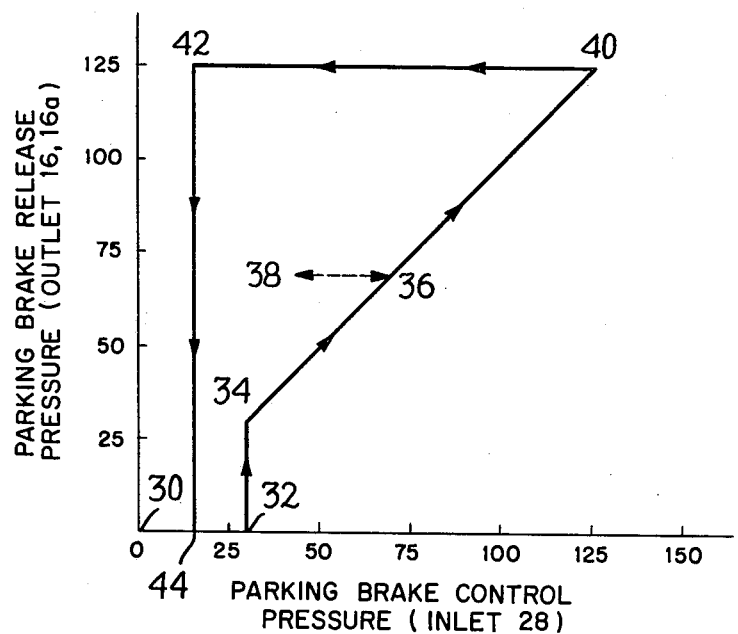
FIG. 2 shows a diagram of inlet versus outlet pressure for the pressure holding valve of the present invention.

FIG. 2 shows a curve of inlet versus outlet pressures for the pressure holding valve 14. Assume that initially, there is no air pressure to the air pressure holding valve 14 inlet. This is represented by point 30 on the curve. As the inlet air pressure is increased, there is no change in outlet air pressure to the spring-actuated parking brakes 16, 16a until point 32 which is conveniently chosen to be about 30 psig. At point 32, the outlet pressure abruptly changes from zero to 30 psig, indicating that the pressure holding valve 14 has abruptly established a connection between its inlet and outlet. As the inlet pressure further increases, the outlet pressure increases in equal step, resulting in the 45 degree line in the figure. If a temporary inlet pressure reduction should take place for example, after reaching point 36, the check-valve action within the pressure holding valve 14 maintains its outlet pressure at the value at point 36 even though its inlet pressure may decline along the dashed line to, for example, point 38. When increase in the inlet pressure resumes, the outlet pressure continues to match the increases until the increase stops at, for example, point 40 on the 45° line.

When the inlet air pressure decreases from point 40, resulting either from operation of the parking brake control 12 or by venting the air pressure in the air pressure reservoir 10, the outlet pressure remains at the peak level established at point 40 until the inlet pressure has decreased to the predetermined low value of air pressure at point 42. The pressure holding valve 14 thereupon abruptly vents its outlet pressure to atmospheric, resulting in the abrupt drop in pressure from point 42 to point 44. This sets the spring-actuated parking brakes 16, 16a. Note that point 44 is a lower value of air pressure than point 32 at which the brake release was initiated.

Figure 3:
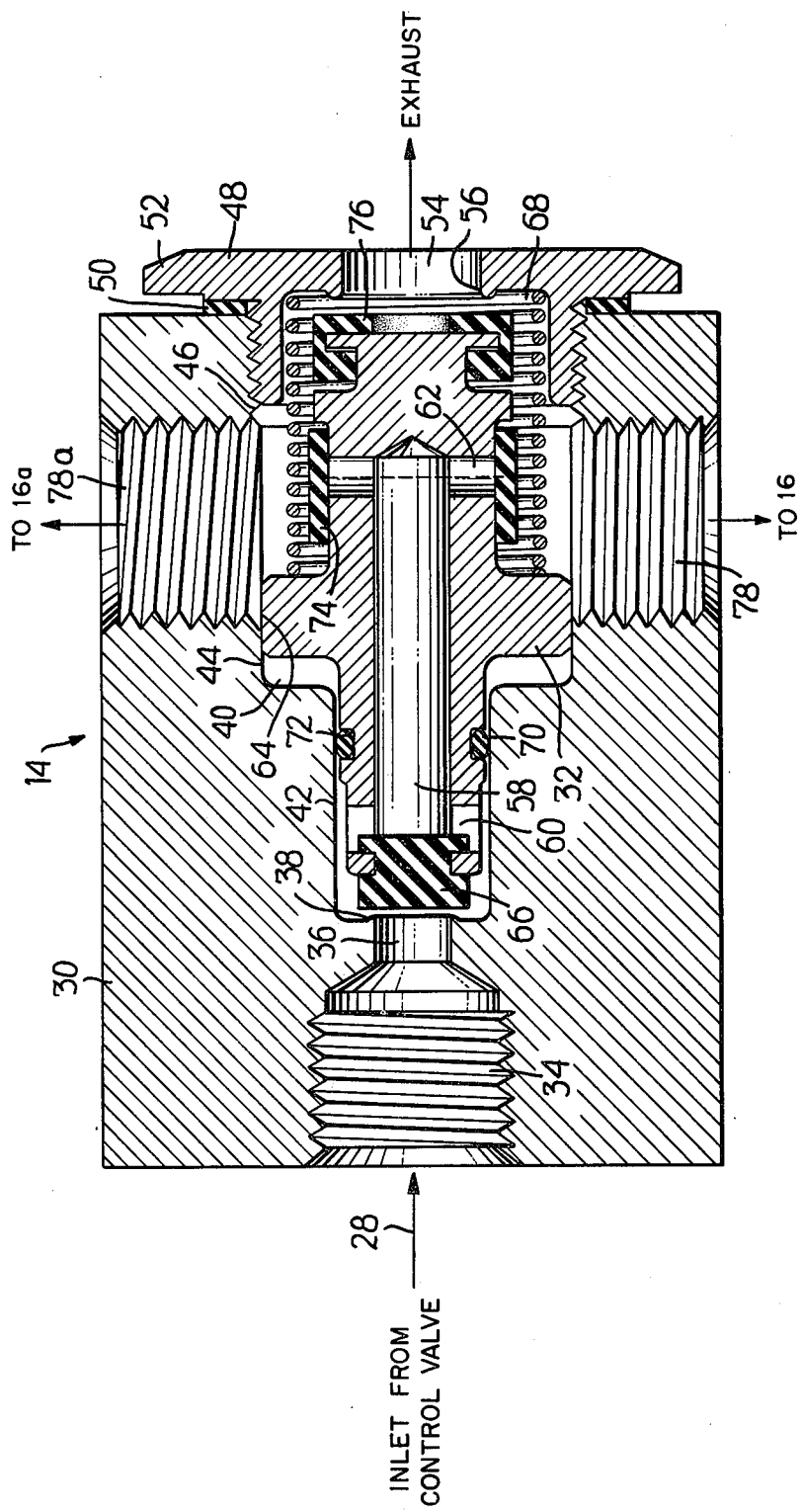
FIG. 3 shows a longitudinal cross sectional diagram of the pressure holding valve of FIG. 1.

Referring now to FIG. 3, the pressure holding valve 14 consists of a body 30 having therein a movable member 32. A threaded inlet connector 34 receives air pressure from pressure line 28 and connects it to an inlet port 36. A raised annular inlet valve seat 38 surrounds the inner end of the inlet port 36. A doublestepped bore 40, having a small diameter cylindrical part 42 adjacent to the inlet port 36, a middle diameter cylindrical part 44 and a large diameter cylindrical part 46, contains the moveable member 32. A cap 48 is sealably fitted in the large diameter cylindrical part 46. A resilient ring 50 in compression between a lip 52 on the cap 48 and the body 30 provides a pressure-proof seal. The cap 48 contains a coaxial exhaust port 54 which is surrounded by a raised annular exhaust valve seat 56 on its inner end.

The moveable member 32 has a blind bore 58 along its axis. A first transverse bore 60 transversely through the moveable member 32 communicates one end of the blind bore 58 with the small diameter cylindrical part 42. A second transverse bore 62 communicates the other end of the blind bore 58 with the medium diameter cylindrical part 44.

A continuous path is thus formed through the first transverse bore 60, the blind bore 58 and the second transverse bore 62. A guide flange 64 on the moveable member 32 bears guidingly and nonsealingly against the inner surface of the medium diameter cylindrical part 44.

A resilient inlet valve 66, adapted to sealing contact with the inlet valve seat 38 is coaxially attached to one end of the moveable member 32. The inlet valve seat 38 and inlet valve 66 together define an effective inlet valve area $A_I$. A spring 68 exerts axial force between the cap 48 and the guide flange 64 resiliently urging the moveable member 32 leftward. In the absence of a predetermined value of air pressure in the inlet port 36, the moveable member 32 is translated leftward until the inlet valve 66 is in sealing contact with the inlet valve seat 38.

A resilient O-ring 70 in an annular groove 72 in the moveable part 32 seals the small diameter cylindrical part 44 against air leakage. The O-ring 70 and the small diameter cylindrical part together define an effective piston area $A_p$. The piston area $A_p$ is larger than the inlet valve area $A_I$.

A resilient band-type valve 74 covers the second transverse bore 62. The band-type valve 74 allows unidirectional passage of air pressure outward from the second transverse bore 62 into the medium diameter cylindrical part 44 but seals the second transverse bore 62 against air pressure flow in the opposite direction.

A resilient exhaust valve 76, adapted to sealing contact with the exhaust valve seat 56, is coaxially attached to the other end of the moveable member 32. The exhause valve 76 and the exhaust valve seat 56 together define an effective exhaust valve area $A_E$. The exhaust valve area $A_E$ is preferably equal to the piston area $A_p$.

A first outlet 78 and a second outlet 78a provide sealed air pressure connection from the medium diameter cylindrical part 44 to the pressure lines leading to the spring-actuated parking brakes 16, 16a respectively.

Initially, with no air pressure in the system, either because of depleted air pressure in the air pressure reservoir 10 or because the parking brake control 12 is in the on position, the moveable member 32 is urged fully to the left by spring 68 until the inlet valve 66 is in sealing contact with the inlet valve seat 38. In this condition, exhaust valve 76 is not in contact with its exhaust valve seat 56. Atmospheric pressure is admitted through the opened exhaust valve 76 to the first and second outlets 78 and 78a, and past the guide flange 64 to the right side of O-ring 70. The spring-actuated parking brakes 16, 16a are engaged by the presence of atmospheric pressure.

When air pressure begins to build up in the inlet port 36, it acts on the effective area $A_I$ of the inlet valve 66. The force exerted is $P \times A_I$, where P is air pressure. The opposing force exerted by the spring 68 maintains sealing contact by inlet valve 66 until the air pressure derived force exceeds the spring 68 force. As soon as the air pressure derived force exceeds the spring 68 force, the inlet valve 66 begins to open. Immediately, air pressure entering the inlet valve 66 acts upon the larger effective piston area $A_p$ formed by the O-ring 70 and the small diameter cylindrical part 42. The effective force opposed by the spring 68 immediately becomes $P \times A_p$ which is much larger than the spring 68 force. The moveable part 32 is rapidly accelerated toward the right by the unbalanced forces until the exhaust valve 76 comes into sealing contact with the exhaust valve seat 56.

The incoming air pressure passes through the first transverse bore 60, the blind bore 56, the second transverse bore 62, past the unidirectional band-type valve 74 and out the first and second outlets 78 and 78a to the spring actuated parking brakes 16, 16a.

If the air pressure in the inlet port 36 should decrease slightly, the band-type valve 74 seals the second transverse bore 62 against the outward leakage of air pressure from the spring-actuated parking brakes 16, 16a.

Since the effective areas $A_p$ of the O-ring and $A_E$ of the exhaust valve are equal, the air pressure in the outlet side of the band-type valve 74 acts equally in the left and right directions. Thus the static force balance which maintains the pressure holding valve 14 in the pressure holding condition just described is between the spring 68 force and the force derived from the air pressure to the left of the O-ring 70 acting on the effective piston area $A_p$. As soon as the inlet air pressure is reduced sufficiently that $P \times A_p$ no longer exceeds the spring 68 force, the moveable member 32 begins translating toward the left. Air pressure immediately begins venting through opened exhaust valve 76. While this venting proceeds, the air pressure to the right of the O-ring 70, no longer being balanced by an equal and opposite force on the exhaust valve 76, acts on the right side of the O-ring 70 to reinforce the spring 68 force in translating the moveable member 32 toward the left. Thus the moveable member is abruptly shuttled from the brakes-off to the brakes-on position.

Note that the air pressure required to initiate the supply of air pressure to the spring-actuated parking brakes 16, 16a is higher than that required terminate the supply. This comes about because initiation of the air pressure supply required the force exerted by $P_2 \times A_I$ to exceed the spring force whereas to terminate the air pressure supply required the pressure to drop until $P_2 \times A_p$ equalled the spring force. Since $A_I$ is much smaller than $A_p$, it follows that $P_I$ must be proportionately higher than $P_2$.

Referring not to FIG. 4 there is shown a pressure holding valve 14 and spring-actuated parking brakes 16, 16a as connected into a braking system having a wheel slip control system, for example of the type disclosed in U.S. Pat. no. 3,951,467.

The spring-actuated parking brakes 16, 16a are released as previously described by air from the air pressure reservoir 10 through the parking brake control 12 and the pressure line 28. The vehicle air service brakes 80 and 80a are shown mounted in tandem with the spring-actuated parking brakes 16, 16a. In a tractor and semi-trailer type vehicle, the semi-trailer brakes are usually connected in parallel with the tractor service brakes 80, 80a using a tractor protection valve 81. In the event open trailer brake lines or trailer breakaway, the tractor protection valve 81 closes the air pressure to the trailer before the tractor air pressure is depleted to zero. In sudden rupture or trailer separation, a momentary air pressure depletion may take place which goes below the brake-release threshold of the pressure holding valve 14. As long as the air pressure depletion does not go below the low air pressure threshold, which is lower than the brake-release threshold, the pressure holding valve 14 holds the spring-actuated parking brakes 16, 16a disengaged and enables normal operator-controlled braking.

The service brakes 80, 80a apply braking force when they receive air pressure from a wheel slip control valve 82. The wheel slip control valve 82 receives reservoir air pressure at a pressure inlet 84 and control air pressure from an application valve 86 at a control inlet 88. The application valve 86 is preferably the vehicle operator's manual control such as a pedal or lever. Under normal braking conditions, the air pressure applied to the service brakes 80, 80a follows the magnitude of the control air pressure at the control inlet 88.

The wheel slip control system in the cross-referenced patent monitors vehicle wheel speed and, when it senses conditions indicating a skid, periodically retards the supply of air pressure from the pressure inlet 84. If retarding the supply of air is not adequate to stop the skid, the wheel slip control system then causes the wheel slip control valve 82 to vent the air pressure from the service brakes 80, 80a for a short time, then reapply the air pressure. The entire wheel slip control procedure takes place while the vehicle operator is applying substantially constant high control air pressure to the wheel slip control valve 82 from the application valve 86.

It would defeat the operation of the wheel slip control system as just described if, during a skid, the vehicle operator were to inadvertently or intentionally place the parking brake control 12 in the on position. The spring-actuated parking brakes 16, 16a would be strongly applied and could lock the vehicle wheels. A deep and uncontrolled skid could result. To avoid this undesirable result, a two-way shuttle valve 90 has been added at the inlet side of the pressure holding valve 14. The two-way shuttle valve 90 applies whichever of its two inputs has the highest pressure to the pressure holding valve 14. Thus, if during a stop, the vehicle operator places the parking brake control 12 in the on condition thereby venting the pressure in pressure line 28, the two-way shuttle valve 90 then applies the control air pressure from the application valve 86 to the pressure holding valve 14. As long as the control air pressure remains above the low threshold of the pressure holding valve, the spring-actuated parking brakes 16, 16a are held in the off condition. The wheel slip control valve 82 and service brakes 80, 80a are thus enabled to bring the vehicle to a stop. If the vehicle operator then ceases to supply the control air pressure, the low air pressure threshold of the pressure holding valve 14 is reached and the parking brakes are engaged as previously described.

The second embodiment of the pressure holding valve 14 shown in FIG. 5 is similar to the pressure holding valve 14 shown in FIG. 3 and previously described except for structural differences in the moveable member 32, modification of the unidirectional valve and the addition of a two-way shuttle valve 90. The following disclosure of the second embodiment is limited to the enumerated differences.

The moveable member 32 is made in two pieces. An inlet piece 92 contains the inlet valve 66 and O-ring 70. A central bore 94 communicating from the first transverse bore 60 terminates in a poppet check valve seat 96. A flange 98 on the inlet piece 92 is retained in an annular recess 100 in the guide flange 64 of an outlet piece 102 using, for example, an expansion ring 104 in an annular slot 106.

An enlarged diameter bore 108 in the outlet, piece 102, contains a resilient poppet check valve 110 which is normally urged into sealing contact with the poppet check valve seat 96 by a check valve spring 112. The poppet check valve 110 has a number of guide fingers 114 in its perimeter as indicated by the absence of cross hatching about the perimeter of the poppet check valve 110. The guide fingers 114 provide lateral guidance to the poppet check valve 110 but allow the free passage of air pressure past its perimeter.

The two-way shuttle valve 90 has a parking brake control inlet 116 adapted to pressure-tight connection to the pressure line 28 from the parking brake control 12 and a brake control pressure inlet 118 adapted to pressure tight connection to the control pressure line from the application valve 86.

A shuttle cylinder 120 is formed by a bore which is sealed at its upper end by a cap 122. Air pressure leakage is prevented by a resilient gasket 124 compressed between a lip 126 on the cap 122 and a mating surface 128.

The shuttle 130 is a rigid sleeve 132, preferably of brass, about the perimeter of a resilient cylinder 134. The ends of the resilient cylinder 134 which protrude from the rigid sleeve 132 have axial conical depressions 136, 136a are adapted to alternate sealing contact with one of the ends 140, 140a of the shuttle cylinder 120, thus sealing the respective port 142 or 142a. A longitudinal opening 144 in the wall of the shuttle cylinder 120 provides air pressure communication between the unsealed port 142 or 142a, and the inlet port 36 of the pressure holding valve 14.

In the position, greater air pressure exists in brake control pressure inlet 118 than in parking brake control inlet 116. The differential pressure urges shuttle 130 upward until the annular sealing lip 138a makes sealing contact with the end 140a of the shuttle cylinder 120. The control air pressure from brake control pressure inlet 118 is admitted through port 142, shuttle cylinder 120, the lower portion of longitudinal slot 144 and inlet port 36 to the inlet valve 66.

If greater pressure exists in parking brake control inlet 116, the shuttle 130 is urged downward until the annular sealing lip 138 makes sealing contact with the end 140 of the shuttle cylinder 120. The parking brake control air pressure from parking brake control inlet 116 is admitted through port 142a, shuttle cylinder 120, the upper portion of longitudinal slot 144 and inlet port 36 to the inlet valve 66.

What is claimed is:

1. A pressure holding valve suitable to effect the application and removal of release air pressure to spring-actuated parking brakes comprising:
   a. means for blocking the entry of air pressure into said pressure holding valve until a first predetermined input air pressure is attained;
   b. an exhaust valve in said pressure holding valve for admitting atmospheric air pressure to said parking brakes;
   c. means for closing said exhaust valve when said first predetermined air pressure is attained;
   d. means for connecting said input air pressure to said parking brakes;
   e. means for holding the air pressure in said parking brakes substantially equal to the highest input air pressure attained after said first predetermined air pressure is once exceeded and until the input air pressure decreases to a second predetermined level;
   f. said second predetermined air pressure being lower than said first predetermined air pressure; and
   g. means for fully opening said exhaust valve when said second predetermined air pressure is attained whereby the brake air pressure is fully exhausted.

2. The pressure holding valve recited in claim 1 wherein said means for holding comprises a unidirectional valve between said means for blocking and said parking brakes.

3. The pressure holding valve recited in claim 2 wherein said unidirectional valve means is a band of resilient material covering at least one opening in a cylindrical member.

4. The pressure holding valve recited in claim 2 wherein said unidirectional valve is a poppet valve.

5. The pressure holding valve recited in claim 1 wherein said means for blocking the entry of air comprises:
   a. inlet valve means adapted to being subjected to said input air pressure;
   b. an inlet valve seat; and c) means for urging said inlet valve means into sealing engagement with said inlet valve seat.

6. The pressure holding valve recited in claim 5 further comprising:
   a. an axially moveable member having first and second positions within said pressure holding valve;
   b. said inlet valve means being affixed to said moveable member;
   c. said exhaust valve being an exhaust port coaxial with said moveable member and having an exhaust valve seat about its perimeter;
   d. said exhaust valve having a sealing member affixed to said moveable member;
   e. said inlet valve means being urged into sealing engagement with said inlet valve seat and said sealing member being urged into disengagement from said exhaust valve seat when said moveable member is in its first position; and
   f. said inlet valve means being urged into disengagement from said inlet valve seat and said sealing member being urged into sealing engagement with said exhaust valve seat when said moveable member is in its second position.

* * * * *